(12) United States Patent
Bashyam et al.

(10) Patent No.: US 9,460,178 B2
(45) Date of Patent: Oct. 4, 2016

(54) SYNCHRONIZED STORAGE SYSTEM OPERATION

(71) Applicant: Dell Products L.P., Round Rock, TX (US)

(72) Inventors: Murali Bashyam, Fremont, CA (US); Sreekanth Garigala, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 14/154,961

(22) Filed: Jan. 14, 2014

(65) Prior Publication Data

US 2014/0214760 A1      Jul. 31, 2014

Related U.S. Application Data (60) Provisional application No. 61/756,561, filed on Jan. 25, 2013.

(51) Int. Cl.
   *G06F 17/30* (2006.01)
(52) U.S. Cl.
   CPC .................. *G06F 17/30575* (2013.01)
(58) Field of Classification Search
   USPC ............... 707/613, 999, 202, 999.204
   See application file for complete search history.

(56) References Cited

U.S. PATENT DOCUMENTS 7,111,139 B2 *   9/2006   Osaki ................... G06F 3/0617
                                                          707/999.202
8,429,098 B1 *   4/2013   Pawar ............... G06F 17/30707
                                                          706/12
2012/0054158 A1 *   3/2012   Hu ....................... G06F 12/0866
                                                          707/692
2014/0195748 A1 *   7/2014   Bashyam ............. G06F 12/121
                                                          711/159

OTHER PUBLICATIONS

Dubois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

(Continued)

*Primary Examiner* — Debbie Le
(74) *Attorney, Agent, or Firm* — Kwan & Olynick LLP (57) ABSTRACT

Techniques and mechanisms described herein facilitate the performance of duplicate data block instruction identification. According to various embodiments, a data block update operation message may be received at a communications interface in a secondary storage node. The secondary storage node may be configured to store secondary data mirroring primary data stored on a primary storage node. The primary data and the secondary data may each include a respective plurality of data blocks. The data block update operation message may include a data block update instruction for updating a designated one of the plurality of secondary storage node data blocks. The data block update operation message may include a primary storage node data block sequence number designating an update operation status. When it is determined that the data block update instruction is not a duplicate, the data block update instruction may be performed.

17 Claims, 6 Drawing Sheets

(56) References Cited

OTHER PUBLICATIONS

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl/edu/cgi/viewcontent.cgi?article=1059&context=csetechreports>, Accessed on Dec. 29, 2013, Jan. 5, 2009, 20 pgs.

* cited by examiner

Figure 1

| Primary Storage Node 200 ||
|---|---|
| Data block identifer 202 | Sequence Number 204 |
| 1 | 9343 |
| 2 | 8240 |
| 3 | 6481 |
| 4 | 7812 |
| 5 | 8156 |

| Secondary Storage Node 250 ||
|---|---|
| Data block identifier 252 | Sequence Number 254 |
| 1 | 9342 |
| 2 | 8240 |
| 3 | 6479 |
| 4 | 7812 |
| 5 | 8156 |

SYNCHRONIZED STORAGE SYSTEM OPERATION

CROSS-REFERENCE TO RELATED APPLICATION

This application claims priority under 35 U.S.C. §119(e) to U.S. Provisional Application 61/756,561 (DELLP039P), titled "EFFICIENT REPLICA CLEANUP DURING RESYNCHRONIZATION," filed Jan. 25, 2013, the entirety of which is incorporated by reference herein for all purposes.

TECHNICAL FIELD

The present disclosure relates to the synchronization and resynchronization of data across different storage nodes.

DESCRIPTION OF RELATED ART

Data is often stored in storage systems that include more than one storage node on which data may be stored. In some systems, the data stored on a primary storage node may be mirrored on one or more secondary storage nodes. Data may be synchronized in this way for several purposes. For instance, storing data on more than one storage mode may provide redundancy in case of storage node failure and/or improved data access times in case one storage node receives more access requests than it can handle in a timely fashion.

In some instances, a secondary storage node may become disconnected from the primary storage node. For instance, network failure or congestion may obstruct traffic between the two nodes, or one of the nodes may suffer from a software or hardware malfunction. When such a disconnection occurs, the data stored on the secondary node may become out-of-sync with the primary node. For instance, data on the primary node may have been added, deleted, or modified during the period of disconnection, and these changes would not be reflected on the data stored on the secondary node.

In these and other situations, the data stored on the secondary node must be checked and modified as necessary to bring it in-sync with the data stored on the primary node. This process is often referred to as resynchronizing the secondary node with the primary node. One important component of resynchronization is identifying and deleting data on the secondary node that has been deleted on the primary node during the time period in which the two nodes are disconnected.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

According to various embodiments, techniques and mechanisms described herein may facilitate the synchronization of storage nodes. In a synchronized storage system, one storage node may be configured to act as a replica of a source storage node. When an operation is performed on data stored on the source storage node, an operation instruction message describing the operation may be transmitted to the replica storage node. In this way, changes made to data stored on the source storage node may be replicated on the replica storage node. A monotonically increasing sequence number may be maintained for data blocks such as files stored in the synchronized storage system. The sequence number may be incremented when an operation is performed on a data block. The sequence number may be transmitted to the replica storage node along with the operation instruction message. The replica storage node may execute the operation instruction if the sequence number included with the instruction exceeds the sequence number associated with the corresponding data block at the replica storage node. In this way, duplicate operation instruction messages may be ignored, while non-duplicate operation instruction messages may be executed, thus maintaining data synchronization across the two storage nodes.

When a block update operation is performed at a primary storage node, a block update instruction message may be transmitted to a secondary storage node configured to replicate the data stored on the primary storage node. Some block update instructions may be considered idempotent. An idempotent block update instruction is one that would yield the same result regardless of whether the instruction were performed once or more than once. Other block update instructions may be considered non-idempotent. A non-idempotent block update instruction is one that would yield different results if performed once or more than once.

When a storage system is configured for replication such that data stored on a primary storage node is replicated on a secondary storage node, the system must ensure that each non-idempotent operation performed at the primary storage node is performed exactly once at the secondary storage node. A non-idempotent operation is one that should not be repeated for any of various reasons, such as potential data loss. For instance, if an operation that truncates a file is performed at the primary storage node, the same operation needs to be performed at the secondary storage node in order to maintain data synchronization across the two storage nodes. If the operation were not performed at the secondary storage node, then the file would not be truncated at the secondary storage node, causing the two files to be out of sync. If instead the operation were performed more than once at the secondary storage node, then data might be lost at the secondary storage node, which would also cause the two files to become out of sync.

Various conditions may result in a mirrored storage node receiving a duplicate non-idempotent request message. For example, network failure may result in a message being dropped. As another example, a process or system failure may result in transmission of a duplicate message. As yet another example, a process or system failure may result in a storage node failing to accurately track which messages have been sent and/or processed. Thus, a replicated storage system needs to be able to efficiently identify duplicate non-idempotent request messages so that non-idempotent instructions are executed exactly once on a mirrored storage node.

Conventional procedures for identifying duplicate non-idempotent requests involve Duplicate Request Cache (DRC) techniques. DRC techniques often involve maintaining a cache to identify duplicate requests. However, maintaining a cache may impose a storage requirement for the cache either in volatile memory (RAM) or persistent storage. If the cache is maintained in volatile memory such as RAM, the cache may be lost on a system or process crash. If instead the cache is stored on persistent storage like hard drive, system performance may suffer due to factors such as increased latency in accessing the cache.

In particular embodiments, one or more techniques described herein may facilitate the efficient identification of duplicate replication operation requests. A monotonically increasing sequence number may be maintained for one or more data blocks such as files that are replicated across storage nodes in a storage system. For instance, the sequence number may be stored as part of the Mode information for a file. The sequence number may be incremented or otherwise updated when an operation is performed on the data block. Some or all file system operations may be tagged with the sequence number. On the mirrored storage system, the tagged sequence number may be checked with the existing sequence number on the file. The operation may then be applied if the tagged sequence number indicates that the operation has not yet been performed on the mirrored storage system. For instance, the operation may be applied if the tagged sequence number is greater than the existing sequence number on the data block at the mirrored storage system. Otherwise, the operation may be identified as a replay and may be ignored.

In particular embodiments, techniques and mechanisms described herein may provide one or more of various advantages over conventional techniques for non-idempotent operation identification. For example, the sequence number can be stored along with block information and require little or no additional storage. For instance, the sequence number may be stored as Mode information. As another example, the sequence number may be maintained along with Mode information thus requiring little or no additional input/output and thus little or no performance penalty. As yet another example, the system may be made robust to system, device, or process crashes. For instance, since the sequence number is persistent, duplicate requests can be identified even after a process crash.

Figure 1:
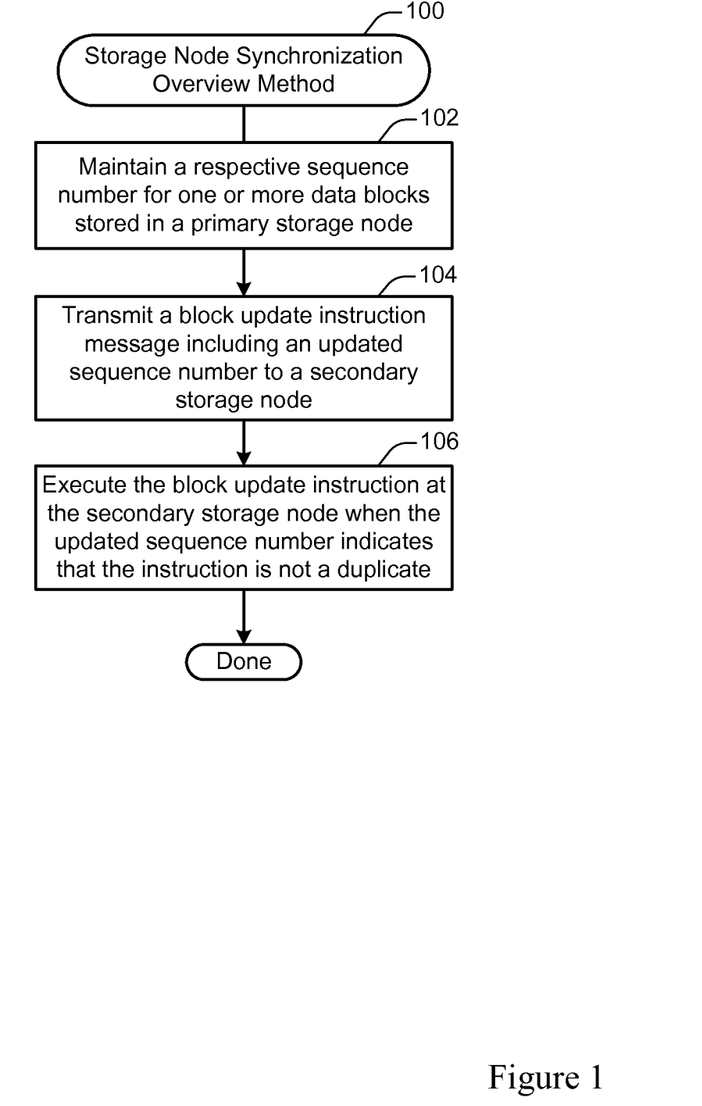
FIG. 1 illustrates an example of a storage node synchronization overview method, performed in accordance with one or more embodiments.

FIG. 1 illustrates an example of a storage node synchronization overview method 100, performed in accordance with one or more embodiments. According to various embodiments, the method 100 may be performed at a storage system in which two or more storage nodes are configured for data storage synchronization.

At 102, a respective sequence number is maintained for one or more data blocks stored in a primary storage node. According to various embodiments, each data block may correspond to any of various types of data. For example, a data block may correspond to a file in a file system. As another example, a data block may correspond to one or more file segments stored in a data deduplication storage system.

According to various embodiments, a data block may be assigned a sequence number. The sequence number may be any number that designates a state or status for the data block that indicates which update operations have been applied to the data block. For instance, the sequence number may be a monotonically increasing number that is incremented each time the data block is updated.

At 104, a block update instruction message including an incremented sequence number is transmitted to a secondary storage node. According to various embodiments, the block update instruction message may be generated when a data block is updated at the primary storage node. When a data block is updated, the sequence number for the updated block may be updated as well. For instance, the sequence number may be incremented.

According to various embodiments, the block update instruction message may include a block update instruction for duplicating the block update performed at the primary storage node. The block update instruction message may also include the updated sequence number. Techniques for performing a block update, updating a sequence number, and transmitting a block update instruction message are discussed in further detail with respect to FIGS. 2 and 3.

At 106, the block update instruction is executed at the secondary storage node when the updated sequence number indicates that the instruction is not a duplicate. For instance, the updated sequence number included in the message may be compared with the sequence number associated with the corresponding block at the secondary storage node. If the updated sequence number indicates that the associated block update instruction has not yet been executed, then the block update instruction may be executed. Otherwise, the block update instruction may be discarded as a duplicate. Techniques for selectively executing a block update instruction at a secondary storage node are discussed in further detail with respect to FIGS. 2 and 4.

Figure 2:
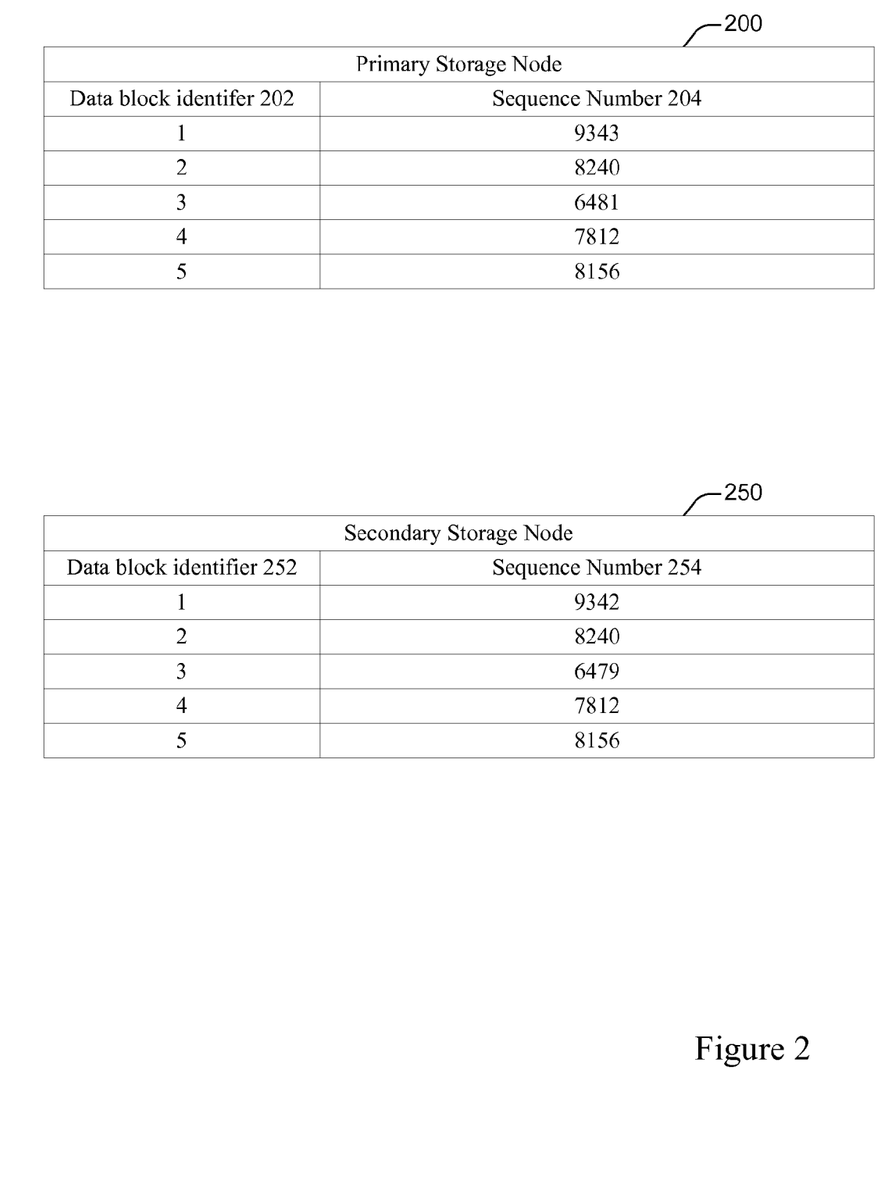
FIG. 2 illustrates a particular example of an arrangement of data blocks in storage nodes.

FIG. 2 illustrates a particular example of an arrangement of data blocks in storage nodes. The arrangement of data blocks shown in FIG. 2 includes an arrangement of data blocks in a primary storage node 200 and an arrangement of data blocks in a secondary storage node 250. Each list of data blocks includes a data block identifier column, column 202 for the primary storage node and column 252 for the secondary storage node. Each list of data blocks also includes a sequence number column, column 204 for the primary storage node and column 254 for the secondary storage node.

According to various embodiments, a storage node may include one or more storage devices configured to store data. For instance, a storage node may include one or more hard drives, tape drives, magnetic drives, non-volatile RAM-drives, memory modules, or other such components. In particular embodiments, a storage node may include other hardware and/or software components such as one or more storage controllers and/or network interfaces. A storage controller may facilitate reading and writing data stored on a storage device included in the storage node.

According to various embodiments, each data block may be any object capable of being stored in a file system. For example, a data block may be a file or a directory. As another example, a data block may be a portion of a file or a directory that is separated into different data blocks.

According to various embodiments, the data block identifier may be an inode. An inode may be used to store information about a file system object, such as file, device node, socket, pipe, etc. This metadata may be used to help track data that is stored on a storage node.

According to various embodiments, each data block may represent any type of data. For instance, a data block may represent an entire file or only a piece of a file. It should be noted that the example shown in FIG. 2 is a simplified for the purpose of clarity. Storage systems typically include many different data blocks, and data block identifiers are often encoded as large binary or hexadecimal numbers, such as 32-bit or 64-bit numbers. However, the simple examples shown in FIG. 2 help to illustrate various techniques and mechanisms described herein.

According to various embodiments, the lists shown in FIG. 2 represent the identifiers and sequence numbers of various data blocks stored in each of the storage nodes. For instance, the data block corresponding to the identifier 2 is associated with the sequence number 8240 in both the primary storage node 200 and the secondary storage node 250.

According to various embodiments, the lists shown in FIG. 2 may be maintained when adding, deleting, and/or modifying data blocks on each storage node. For instance, when a data block is added to the primary storage node, it may be assigned a new data block identifier. Then, a new entry may be added to the primary storage node list that includes the new data block identifier and a sequence number associated with the new data block. If a data block is deleted from the primary storage node, then the row corresponding to that data block may be deleted from the list.

According to various embodiments, each data block stored in the primary node may be assigned a unique identifier. In many storage systems, identifiers are assigned incrementally and are not recycled. For instance, each data block may be assigned a 64-bit identifier that is not used for any other data block. When the data block is deleted, the 64-bit identifier is then retired from use. In other storage systems, identifiers may eventually be reassigned. However, reassigned identifiers may still be made effectively unique in other ways, such as assigning each identifier with a version number which, when provides uniqueness when it is combined with the identifier. In the example shown in FIG. 2, the data blocks corresponding to the identifiers 1 through 8 have been assigned.

According to various embodiments, a storage system that includes primary and secondary storage nodes may be configured to synchronize the secondary storage node based on changes to the primary storage node. For instance, if a data block is added to or modified on the primary storage node, it should be added to or modified on almost immediately on the secondary storage node. Likewise if a data block is deleted from the primary storage node, it should be deleted as soon as possible from the secondary storage node.

According to various embodiments, when the two storage nodes are synchronized, each storage node stores the same data blocks. In particular embodiments, each data block may be assigned the same data block identifier on each storage node. Alternately, the data block identifiers across storage nodes may differ but may correspond with each other in some way, such as via a directory look up or matching function. However, it should be noted that although the storage system is configured to synchronize the two storage nodes, the data blocks stored on the two storage nodes need not be stored at the same location on the two storage nodes. For instance, the storage nodes may differ in terms of hardware, which may lead the same data to be stored at different locations.

In the example shown in FIG. 2, the two storage nodes are out-of-sync. For example, both storage nodes include the data block 1. However, the data block 1 has a sequence number of 9343 at the primary storage node 200 and a sequence number of 9342 at the secondary storage node 250. As another example, the data block 3 has a sequence number of 6481 at the primary storage node and a sequence number of 6479 at the secondary storage node. These inconsistencies indicate that non-idempotent operations have been performed at the primary storage node 200 but have not yet been performed at the secondary storage node 250.

According to various embodiments, a storage system may potentially have many primary nodes, and each primary node may be potentially mirrored on many secondary nodes. However, for the purpose of clarity, some examples described herein focus on a single primary node and its synchronization with a single secondary node that mirrors the data stored on the primary node.

Figure 3:
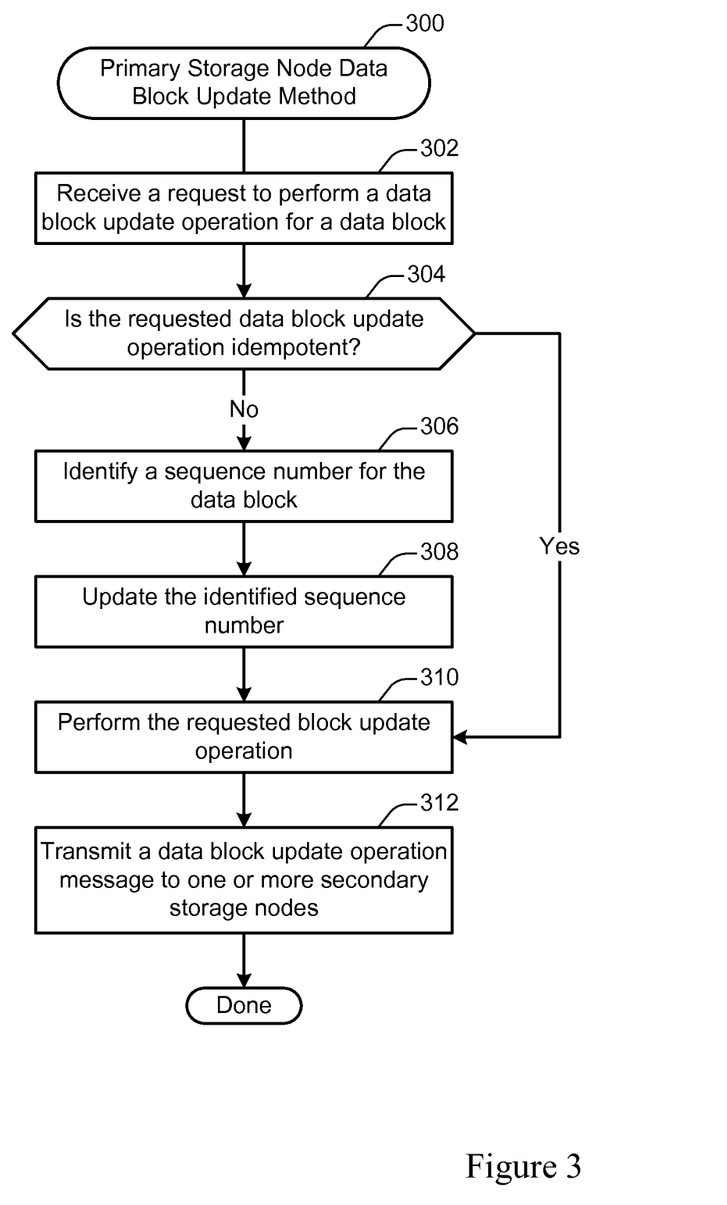
FIG. 3 illustrates an example of a primary storage node data block update method, performed in accordance with one or more embodiments.

FIG. 3 illustrates an example of a primary storage node data block update method 300, performed in accordance with one or more embodiments. According to various embodiments, the method 300 may be performed at a primary storage node configured to store data that is synchronized with one or more secondary storage nodes. The primary storage node may act as the data source, while the secondary storage node may act as a mirror of the data source. For instance, the method 300 may be performed when a request to perform a data block update operation is received at the primary storage node.

At 302, a request to perform a data block update operation for a data block is received. According to various embodiments, the request may be transmitted from a computing device. The requested data block update operation may include any operation for altering the data block. For instance, a data block may be created, deleted, copied, truncated, appended to, or otherwise updated.

At 304, a determination is made as to whether the data block update operation is idempotent. According to various embodiments, the storage system may support various types of idempotent and/or non-idempotent data block update operations. For example, non-idempotent data block update operations may include, but are not limited to: appending to a data block, creating a data block, deleting a data block, and exclusively creating a data block. For instance, when deleting a data block, a second delete operation may fail with an error such as "file does not exists". Idempotent data block update operations may include, but are not limited to: truncating a data block to a designated offset and writing data to a designated data block or location.

According to various embodiments, sequences of operations may be non-idempotent even when composed of one or more idempotent operations. For example, suppose that the primary storage node executes the operations: (1) Create File F, (2) Remove File F, and (3) Make Directory F. After these three operations, the primary storage node will have stored "F as a directory." If the secondary storage node were to first implement all three operations and were then attempted to implement a duplicate of operation (1), the operation would fail since F would already exist on the secondary storage node. Thus, one or both of the primary or secondary storage nodes may designate an operation or set of operations as non-idempotent based on a logical connection between different operations.

At 306, a sequence number for the data block is identified. According to various embodiments, the sequence number may be identified by accessing data block information such as the information shown in FIG. 2. For instance, i-node information may be maintained for files stored on the primary storage node. The i-node information associated with a data file may identify information about the data file such as the disk location where the data file is stored and other attributes associated with the data file.

At 308, the identified sequence number is updated. According to various embodiments, various techniques for updating the identified sequence number may be used. For example, in some implementations, the sequence number may be implemented as a monotonically increasing number that is not reused. In this case, updating the identified sequence number may involve incrementing the identified sequence number.

Although the sequence number is frequently described herein as monotonically increasing, other schemes for maintaining sequence numbers are possible. For instance, the sequence number may be monotonically decreasing instead of increasing. Any arrangement of sequence numbers may be followed so long as the sequence may be used to determine whether an update operation has been applied and the sequence is known to the source storage node as well as any mirrored storage nodes.

At 310, the requested data block update operation is performed. According to various embodiments, performing the data block update operation may involve executing one or more operations for altering the data block. For instance, a data block may be created, deleted, copied, truncated, appended to, rearranged, or otherwise altered.

At 312, a data block update operation message is transmitted to one or more secondary storage nodes. For instance, the data block update operation may be transmitted via a network or a bus. The data block update operation message may be associated with a single data block update operation or with more than one data block update operations grouped together.

According to various embodiments, the data block update operation message may identify various information that may be used by the secondary storage node to duplicate the data block update operation performed at the primary storage node, for instance, the data block update operation message may identify the data block update operation to perform, the data block on which the operation is to be performed, and the updated sequence number associated with the data block.

According to various embodiments, the data block update operation message may be transmitted at any of various times. For example, the data block update operation message may be transmitted after the data block update operation is performed at the primary storage node. As another example, the data block update operation message may be transmitted again after an error is detected. The types of errors that may trigger the re-sending of a data block update operation message may include, but are not limited to: a network failure, a storage system failure, a primary and/or secondary storage node failure, or a primary and/or secondary storage node process crash is detected.

Figure 4:
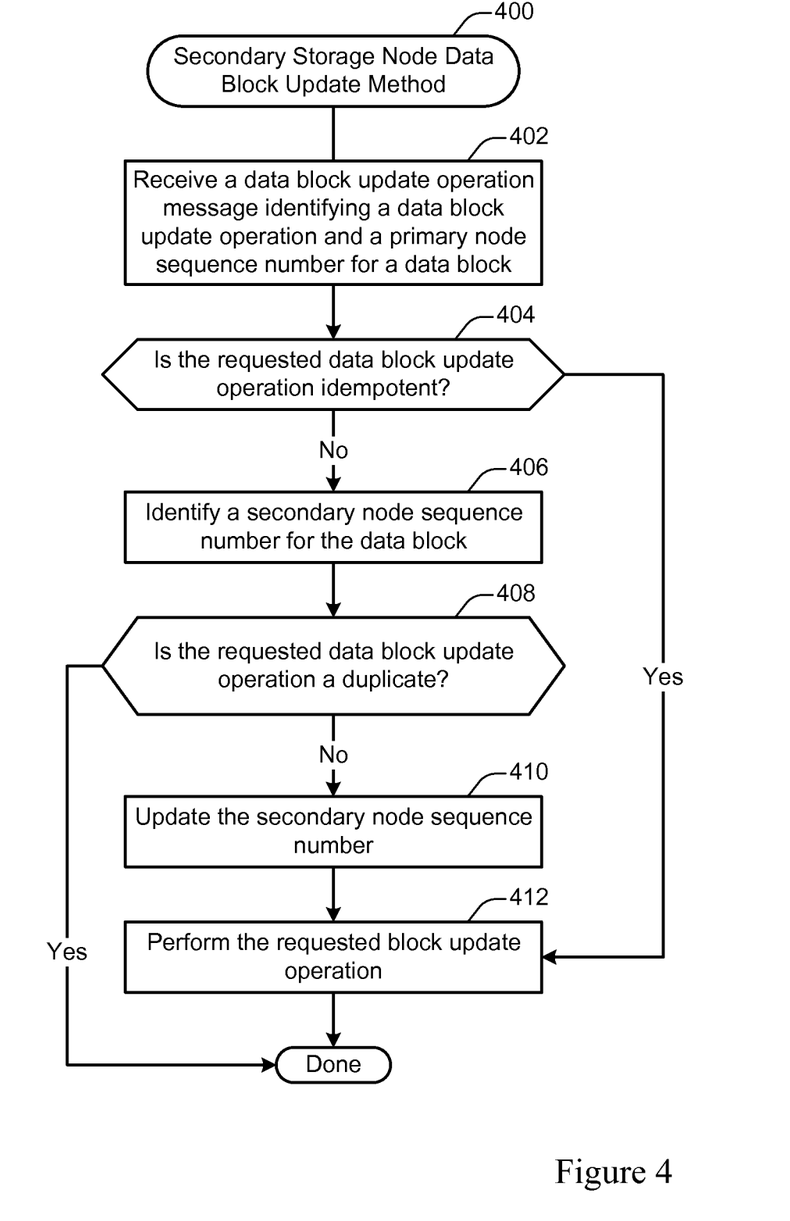
FIG. 4 illustrates an example of a secondary storage node data block update method, performed in accordance with one or more embodiments.

FIG. 4 illustrates an example of a secondary storage node data block update method 400, performed in accordance with one or more embodiments. According to various embodiments, the method 400 may be performed at a secondary storage node configured to store data that is synchronized with a primary storage node. The primary storage node may act as the data source, while the secondary storage node may act as a mirror of the data source. For instance, the method 400 may be performed when a data block update operation message is processed at the secondary storage node.

At 402, a data block update operation message is received. According to various embodiments, the data block update message may identify a data block update operation and a primary sequence number for a data block.

According to various embodiments, receiving the data block update message may involve receiving the message transmitted via a network. Alternately, receiving the data block update message may involve selecting a previously received message for processing. For instance, messages received via a network may be inserted into a queue for processing.

The data block update message may be a new message that has not yet been received or may be a duplicate of a previously received message. For example, as discussed with respect to operation 312, various error conditions may result in the same data block update message being sent more than once. As another example, a data block update message may potentially be selected from a queue for processing more than once. For instance, an error condition such as a process crash or node crash at the secondary storage node may result in a data update operation being performed without removing the corresponding message from the queue.

At 404, a determination is made as to whether the data block update operation is idempotent. According to various embodiments, the storage system may support various types of idempotent and/or non-idempotent data block update operations. For example, non-idempotent data block update operations may include, but are not limited to: appending to a data block, creating a data block, deleting a data block, and exclusively creating a data block. For instance, when deleting a data block, a second delete operation may fail with an error such as "file does not exists". Idempotent data block update operations may include, but are not limited to: truncating a data block to a designated offset and writing data to a designated data block or location.

At 406, a secondary node sequence number for the data block is identified. According to various embodiments, the secondary node sequence number may be identified by accessing data block information such as the information shown in FIG. 2. For instance, i-node information may be maintained for files stored on the primary storage node. The i-node information associated with a data file may identify information about the data file such as the disk location where the data file is stored and other attributes associated with the data file.

At 408, a determination is made as to whether the requested data block update operation is a duplicate. According to various embodiments, whether the requested data block update operation is a duplicate may be determined based on a comparison of the primary node sequence number with the secondary node sequence number. For instance, if monotonically increasing sequence numbers are used, then the requested data block update operation may be identified as a duplicate if the secondary node sequence number is greater than or equal to the primary node sequence number. If instead the secondary node sequence number is less than the primary node sequence number, then the requested data block update operation may be identified as an operation that is not a duplicate and that has not yet been performed at the secondary storage node.

At 410, the secondary node sequence number is updated. According to various embodiments, various techniques may be used to update the secondary node sequence number. For example, when the sequence number is a monotonically increasing number that is not reused, the secondary node sequence number may be incremented. As another example, the secondary node sequence number may be replaced with the primary node sequence number.

At 412, the requested data block update operation is performed if the requested operation is not a duplicate non-idempotent operation. According to various embodiments, performing the data block update operation may involve executing one or more operations for altering the data block. For instance, a data block may be created, deleted, copied, truncated, appended to, rearranged, or otherwise altered.

If the requested operation is both a duplicate and is non-idempotent, then the requested operation may be ignored. If the requested operation is idempotent, then the requested operation may be performed without checking whether it is a duplicate since performing an idempotent operation more than once will not result in additional changes.

In particular embodiments, an operation may be a non-duplicate but may be received out of order. For example, the primary storage node may perform operations 1, 2, and 3. Then, the primary storage node may send messages describing each of these operations along with the corresponding sequence numbers to the secondary storage node. In this example, suppose that the message corresponding with operation 2 is lost due to network failure, and that the secondary storage node first receives the messages corresponding with operations 1 and 3. Then, the secondary storage node may execute operation 1 since it is not a duplicate and has not yet been executed. However, the secondary storage node may delay execution of operation 3 since, based on the sequence numbers, the secondary storage node can determine that the primary storage node first applied an intervening operation. Then, when the secondary storage node receives the message corresponding to operation 2, for instance when the primary storage node resends the message, the secondary storage node may execute operation 3 after executing operation 2.

Figure 5:
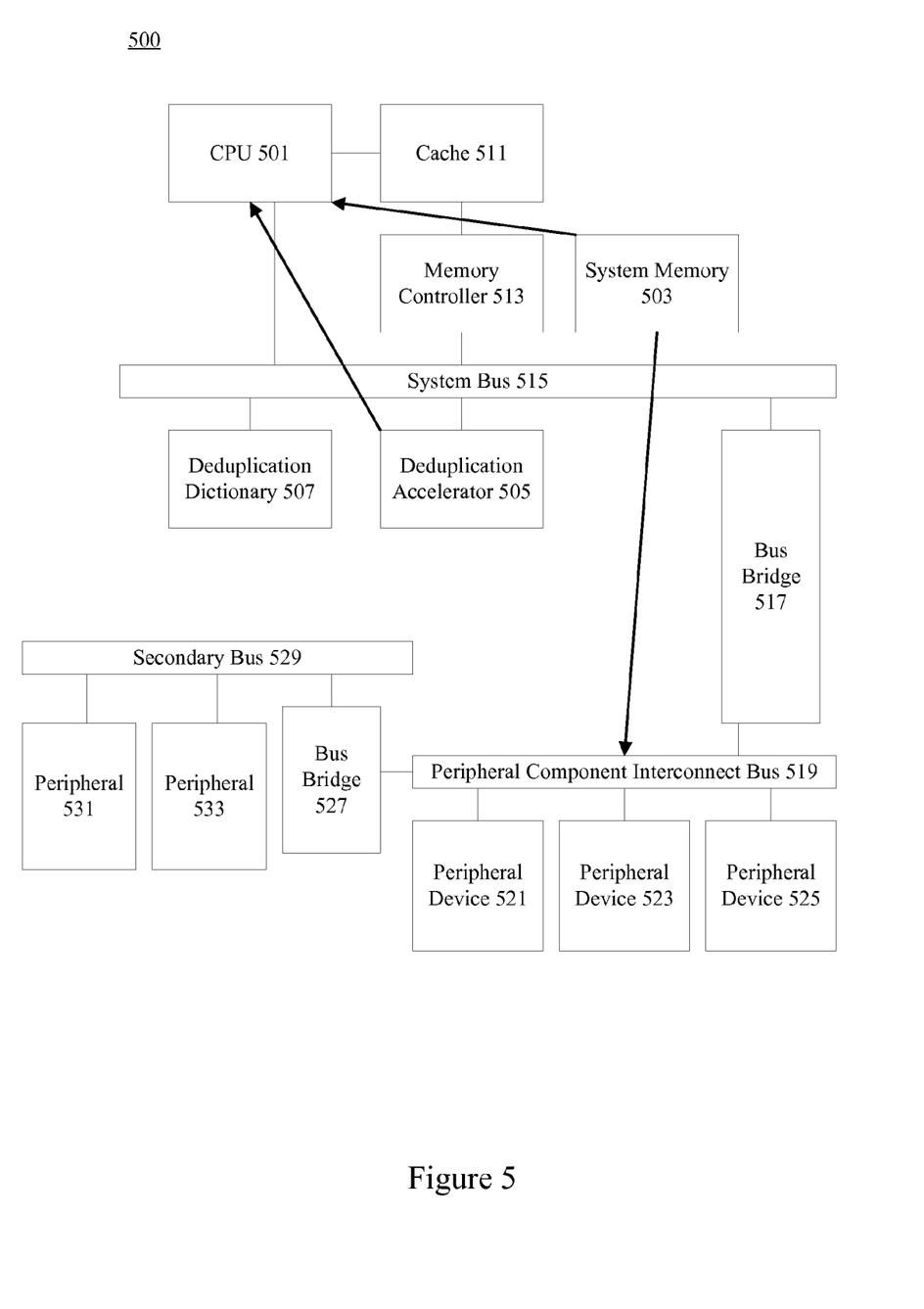
FIG. 5 illustrates a particular example of a system that can use the techniques and mechanisms of the present invention.

FIG. 5 illustrates a particular example of a system that can use the techniques and mechanisms of the present invention. According to various embodiments, data is received at an accelerated deduplication system 500 over an interface such as a network interface. A data stream may be received in segments or blocks and maintained in system memory 503. According to various embodiments, a processor or CPU 501 maintains a state machine but offloads boundary detection and fingerprinting to a deduplication engine or deduplication accelerator 505. The CPU 501 is associated with cache 511 and memory controller 513. According to various embodiments, cache 511 and memory controller 513 may be integrated onto the CPU 501.

In particular embodiments, the deduplication engine or deduplication accelerator 505 is connected to the CPU 501 over a system bus 515 and detects boundaries using an algorithm such as Rabin to delineate segments of data in system memory 503 and generates fingerprints using algorithms such as hashing algorithms like SHA-1 or MD-5. The deduplication engine 505 accesses the deduplication dictionary 507 to determine if a fingerprint is already included in the deduplication dictionary 507. According to various embodiments, the deduplication dictionary 507 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 501 the final destination direct memory access (DMA) addresses for the data. The DMA addresses can then be used to transfer the data through one or more bus bridges 517 and/or 527 and secondary buses 519 and/or 529. In example of a secondary bus is a peripheral component interconnect (PCI) bus 519. Peripherals 521, 523, 525, 531, and 533 may be peripheral components and/or peripheral interfaces such as disk arrays, network interfaces, serial interfaces, timers, tape devices, etc.

Figure 6:
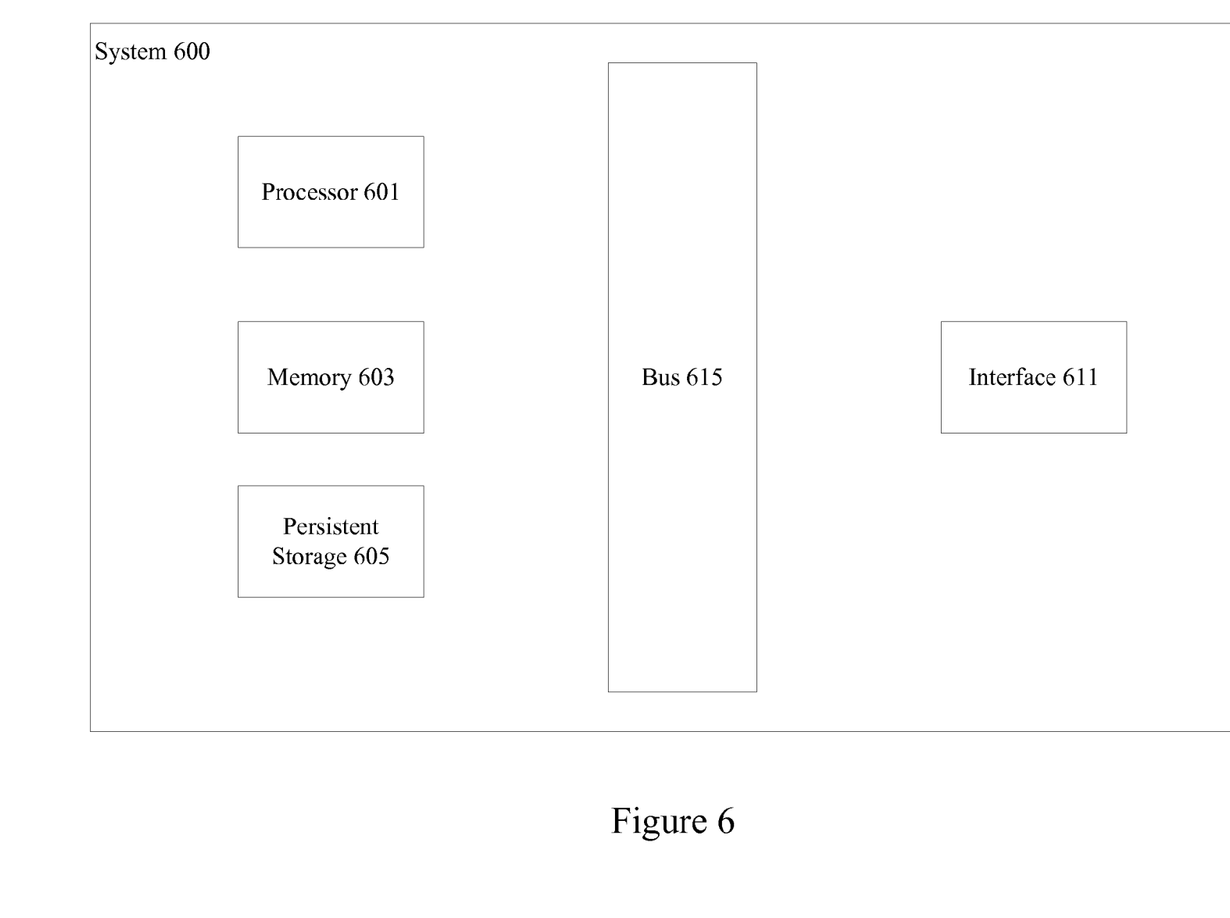
FIG. 6 illustrates a particular example of a storage system.

A variety of devices and applications can implement particular examples of the present invention. FIG. 6 illustrates one example of a system that can be used as a storage node in a deduplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   receiving a data block update operation message at a communications interface in a secondary storage node, the secondary storage node configured to store secondary data mirroring primary data stored on a primary storage node, the primary data and the secondary data each including a respective plurality of data blocks, the data block update operation message including a data block update instruction for updating a designated one of the plurality of secondary storage node data blocks, the data block update operation message including a primary storage node data block sequence number designating an update operation status, wherein the secondary storage node data block sequence number is one of a plurality of sequence numbers associated with data blocks stored at the secondary storage node, wherein each data block is a file, wherein there is a one-to-one relationship between the data blocks and the sequence numbers, and wherein the primary data is stored in accordance with a data deduplication storage procedure;
   determining, via a processor, whether the data block update instruction is a duplicate based at least in part on the primary storage node data block sequence number; and
   when it is determined that the data block update instruction is not a duplicate, performing the data block update instruction for the designated secondary storage node data block at the secondary storage node.

2. The method recited in claim 1,
   wherein the plurality of primary storage node data blocks includes a designated primary storage node data block corresponding with the designated secondary storage node data block.

3. The method recited in claim 2,
   wherein the primary storage node data block sequence number is selected from a set of monotonically increasing or monotonically decreasing numbers associated with the designated primary storage node data block.

4. The method recited in claim 2,
   wherein the primary storage node data block sequence number indicates that the data block update instruction has been applied to the primary storage node data block.

5. The method recited in claim 1,
   wherein determining whether the data block update instruction is a duplicate comprises comparing the primary storage node data block sequence number to a secondary storage node data block sequence number associated with the designated secondary storage node data block.

6. The method recited in claim 5,
   wherein determining whether the data block update instruction is a duplicate comprises determining whether the primary storage node data block sequence number is greater than the secondary storage node data block sequence number.

7. The method recited in claim 1, the method further comprising:
   updating the secondary storage node data block sequence number by incrementing or decrementing the secondary storage node data block sequence number.

8. A secondary storage node comprising:
   memory operable to store secondary data mirroring primary data stored on a primary storage node, the primary data and the secondary data each including a respective plurality of data blocks, wherein the secondary storage node data block sequence number is one of a plurality of sequence numbers associated with data blocks stored at the secondary storage node, wherein each data block is a file, wherein there is a one-to-one relationship between the data blocks and the sequence numbers, and wherein the primary data is stored in accordance with a data deduplication storage procedure; and
   a communications interface operable to receive a data block update operation message, the data block update operation message including a data block update instruction for updating a designated one of the plurality of secondary storage node data blocks, the data block update operation message including a primary storage node data block sequence number designating an update operation status; and a processor operable to determine whether the data block update instruction is a duplicate based at least in part on the primary storage node data block sequence number, and to perform the data block update instruction for the designated secondary storage node data block at the secondary storage node when it is determined that the data block update instruction is not a duplicate.

9. The secondary storage node recited in claim 8,
wherein the plurality of primary storage node data blocks includes a designated primary storage node data block corresponding with the designated secondary storage node data block.

10. The secondary storage node recited in claim 9,
wherein the primary storage node data block sequence number is selected from a set of monotonically increasing or monotonically decreasing numbers associated with the designated primary storage node data block.

11. The secondary storage node recited in claim 9,
wherein the primary storage node data block sequence number indicates that the data block update instruction has been applied to the primary storage node data block.

12. The secondary storage node recited in claim 8,
wherein determining whether the data block update instruction is a duplicate comprises comparing the primary storage node data block sequence number to a secondary storage node data block sequence number associated with the designated secondary storage node data block.

13. The secondary storage node recited in claim 12,
wherein determining whether the data block update instruction is a duplicate comprises determining whether the primary storage node data block sequence number is greater than the secondary storage node data block sequence number.

14. One or more computer readable media having instructions stored thereon for performing a method, the method comprising:
receiving a data block update operation message at a communications interface in a secondary storage node, the secondary storage node configured to store secondary data mirroring primary data stored on a primary storage node, the primary data and the secondary data each including a respective plurality of data blocks, the data block update operation message including a data block update instruction for updating a designated one of the plurality of secondary storage node data blocks, the data block update operation message including a primary storage node data block sequence number designating an update operation status, wherein the secondary storage node data block sequence number is one of a plurality of sequence numbers associated with data blocks stored at the secondary storage node, wherein each data block is a file, wherein there is a one-to-one relationship between the data blocks and the sequence numbers, and wherein the primary data is stored in accordance with a data deduplication storage procedure;
determining, via a processor, whether the data block update instruction is a duplicate based at least in part on the primary storage node data block sequence number; and
when it is determined that the data block update instruction is not a duplicate, performing the data block update instruction for the designated secondary storage node data block at the secondary storage node.

15. The one or more computer readable media recited in claim 14,
wherein the plurality of primary storage node data blocks includes a designated primary storage node data block corresponding with the designated secondary storage node data block.

16. The one or more computer readable media recited in claim 15,
wherein the primary storage node data block sequence number is selected from a set of monotonically increasing or monotonically decreasing numbers associated with the designated primary storage node data block.

17. The one or more computer readable media recited in claim 15,
wherein the primary storage node data block sequence number indicates that the data block update instruction has been applied to the primary storage node data block.

* * * * *